(12) United States Patent
Strogov et al.

(10) Patent No.: US 11,562,067 B2
(45) Date of Patent: Jan. 24, 2023

(54) SYSTEM AND METHOD OF INSPECTING ARCHIVE SLICES FOR MALWARE USING EMPTY SPARSE FILES

(71) Applicant: Acronis International GmbH, Schaffhausen (CH)

(72) Inventors: Vladimir Strogov, Moscow (RU); Anatoly Stupak, Moscow (RU); Andrey Kulaga, Moscow (RU); Alexey Sergeev, Moscow (RU); Serguei Beloussov, Costa Del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 103 days.

(21) Appl. No.: 17/201,282

(22) Filed: Mar. 15, 2021

(65) Prior Publication Data
US 2021/0200866 A1 Jul. 1, 2021

Related U.S. Application Data

(63) Continuation-in-part of application No. 16/798,709, filed on Feb. 24, 2020, now Pat. No. 11,328,061.
(Continued)

(51) Int. Cl.
*G06F 21/00* (2013.01)
*G06F 21/56* (2013.01)

(52) U.S. Cl.
CPC .......... *G06F 21/562* (2013.01); *G06F 21/568* (2013.01); *G06F 2221/033* (2013.01)

(58) Field of Classification Search
CPC . G06F 21/562; G06F 21/568; G06F 2221/033
See application file for complete search history.

(56) References Cited

U.S. PATENT DOCUMENTS

| | | | | |
|---|---|---|---|---|
| 8,607,342 B1 * | 12/2013 | Liao | ...................... | G06F 21/568 |
| | | | | 726/22 |
| 9,268,689 B1 * | 2/2016 | Chen | ................... | G06F 12/1027 |
| (Continued) | | | | |

OTHER PUBLICATIONS

Xu et al., "Malicious code passive propagation model and vaccine distribution model of P2P networks", Journal of Systems Engineering and Electronics, vol. 21, Issue: 1, February (Year: 2010).*
(Continued)

*Primary Examiner* — Morshed Mehedi
(74) *Attorney, Agent, or Firm* — ArentFox Schiff LLP; Michael Fainberg (57) ABSTRACT

Disclosed herein are systems and method for inspecting archived slices for malware using empty spare files. In one exemplary aspect, the method comprises generating a backup slice and a virtual volume comprising a list of files in the backup slice and associated file information. The method comprises mounting the virtual volume to a disk. The method comprises creating, in the virtual volume, empty sparse files that are placeholders of the files reference in the list of files. The method comprises detecting a change between a respective empty sparse file and a corresponding file in a previous backup slice and accordingly storing the actual content of the file in the virtual volume in place of the respective empty sparse file. The method comprises scanning the virtual volume for malicious software and generating a cured slice that replaces the backup slice in the backup archive upon detection.

20 Claims, 7 Drawing Sheets

Related U.S. Application Data

(60) Provisional application No. 62/874,548, filed on Jul. 16, 2019.

(56) References Cited

U.S. PATENT DOCUMENTS

| | | | |
|---|---|---|---|
| 9,785,647 B1 | 10/2017 | Petri et al. | |
| 2004/0158730 A1 | 8/2004 | Sarkar | |
| 2006/0230449 A1* | 10/2006 | Fox | G06F 21/564 |
| | | | 726/22 |
| 2016/0092131 A1* | 3/2016 | Nakajima | G06F 3/0604 |
| | | | 711/111 |
| 2021/0019404 A1* | 1/2021 | Strogov | G06F 11/1451 |

OTHER PUBLICATIONS

Anonymous: "X-Ways Software Technology AG X-Ways Forensics/WinHex Contents", Mar. 10, 2016 (Mar. 10, 2016), XP055625485, Retrieved from the Internet.

* cited by examiner

SYSTEM AND METHOD OF INSPECTING ARCHIVE SLICES FOR MALWARE USING EMPTY SPARSE FILES

CROSS-REFERENCE TO RELATED APPLICATIONS

This application is a continuation-in-part of U.S. Non-Provisional application Ser. No. 16/798,709 and claims benefit of priority to U.S. Provisional Patent Application No. 62/874,548 filed on Jul. 16, 2019, which is herein incorporated by reference in its entirety.

FIELD OF TECHNOLOGY

The present disclosure relates generally to the field of virus and malware detection in stored archives, and more specifically, to systems and method of scanning backup archives by inspecting slices of the archive for malware using empty sparse files.

BACKGROUND

Typically, the backup and storage of archives for recovery is performed regularly according to a schedule. It is often the case that the backup may become tainted with malicious software, therefore companies often have automated software that performs malware scans, either prior to backup, during backup, prior to restoration or the like. Virus and malware scans should be carried out periodically and regularly because anti-virus databases are updated often due to the emergence of new types of malware. However, full scanning of large archives requires considerable time and computational resources, often not available or not an efficient use of the time and resources. Scanning archives becomes especially critical if the archives are not stored locally, but in cloud storage, because the speed of access to an archive in the cloud may be significantly slower than accessing a local storage device (depending on the speed of the network or communication channel being used, and/or how heavily the channel is loaded). Additionally, if any problems arise such that viruses and/or malicious files are found in the archive, the archive is considered damaged or infected, and may not be entirely suitable for use in system recovery or file and data extraction.

Conventionally, to avoid restoring data that is infected, archives are periodically scanned with anti-virus scanners during storage, when new slices are added to the archive and/or before restoring the data. However, currently there is no solution to scan arbitrary time points in an archive. Instead, solutions are forced to scan the entire archive. Furthermore, currently damaged or infected data in archives cannot be repaired.

SUMMARY

Aspects of the disclosure relate to the field of virus and malware detection in stored archives. In particular, aspects of the disclosure describe methods and systems for scanning backup archives by inspecting slices of the archive.

In one exemplary aspect, the method comprises generating a backup slice that reflects a state of data at a first time, wherein the backup slice is stored in a backup archive. The method comprises generating a virtual volume comprising a list of files in the backup slice and associated file information, wherein the virtual volume does not store the files referenced in the list of files. The method comprises mounting the virtual volume to a disk. The method comprises creating, in the virtual volume, empty sparse files that are placeholders of the files reference in the list of files. The method comprises for each respective empty sparse file: comparing file information associated with the respective empty sparse file with file information associated with a corresponding file in another backup slice reflecting the state of data at a second time, and in response to detecting a change between the respective empty sparse file and the corresponding file: retrieving content associated with the respective empty sparse file from the backup slice; and storing the content in the virtual volume in place of the respective empty sparse file. The method comprises scanning the virtual volume for viruses and/or malicious software. The method comprises in response to detecting that at least one file in the virtual volume is infected with a virus and/or malicious software, generating a cured slice that replaces the backup slice in the backup archive.

In some aspects, the first time is after the second time.

In some aspects, the virtual volume is generated by a virtual volume driver.

In some aspects, the associated file information comprises at least one of: (1) a file number of a respective file in the list, (2) a location of the respective file in the backup slice, and (3) a file size of the respective file.

In some aspects, generating the cured slice comprises removing the at least one file from the mounted virtual volume.

In some aspects, generating the cured slice comprises generating a copy of the backup slice, and transferring, to the copy of the backup slice, all unchanged files in the list of files and not including the at least one file, wherein the copy of the backup slice is the cured slice.

In some aspects, the virtual volume is mounted to the disk subsequent to or concurrently with another virtual volume associated with the another backup slice.

In some aspects, adding the cured slice to the backup archive.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for inspecting archive slices for malware. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
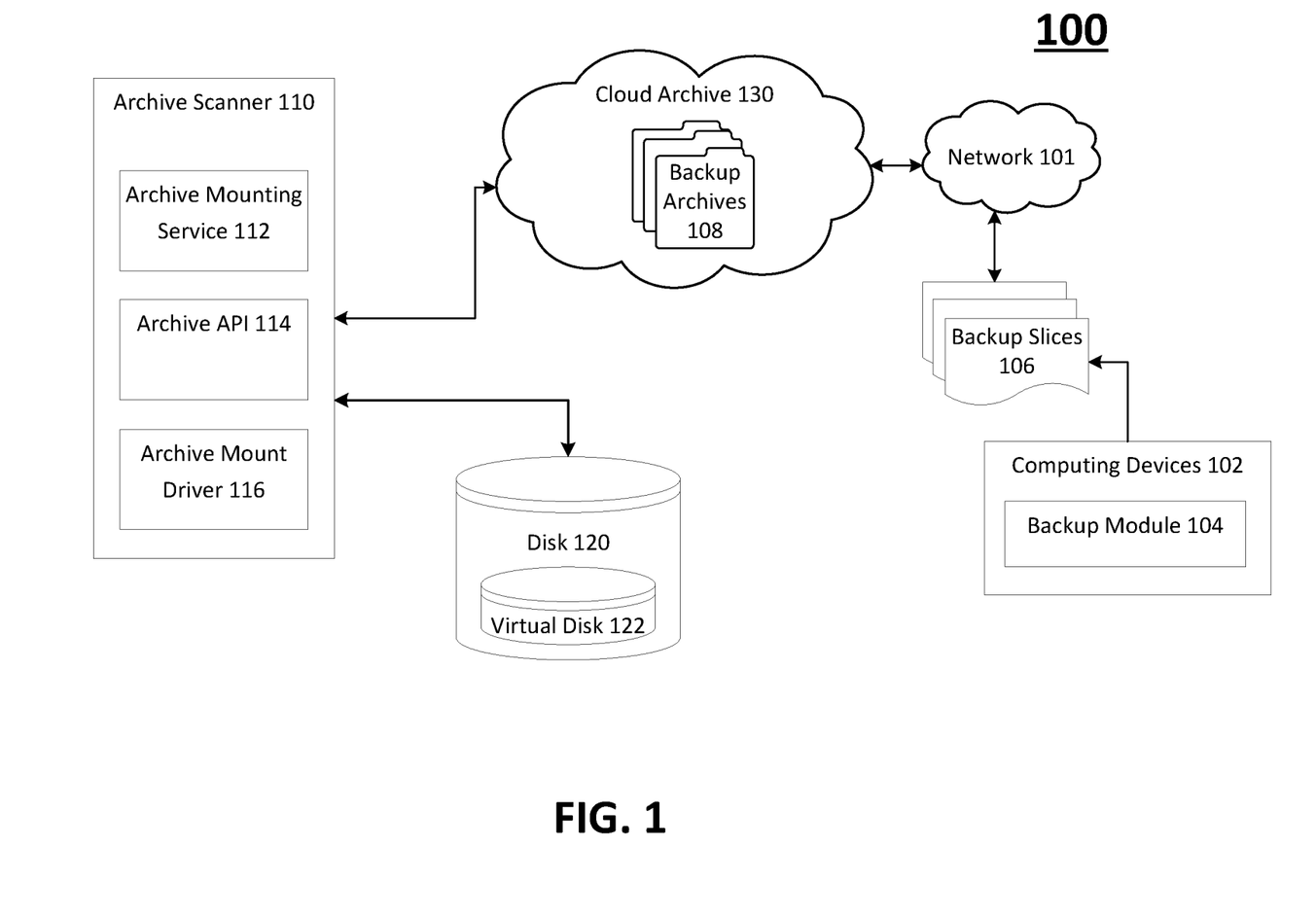
FIG. 1 is a block diagram of a system of scanning backup archives by inspecting archive slices.

FIG. 1 is a block diagram of a system 100 of scanning backup archives by inspecting archive slices, in accordance with exemplary aspects of the present disclosure.

The system 100 comprises a computing device 102, an archive scanner 110, a disk 120, and a cloud archive 130. The client computing device 102 may be any type of mobile computing device such as a laptop computer, a tablet computer, a mobile device, or the like. The computing device 102 also includes a backup module 104 that performs a backup of user data stored on the computing device 102, wherein the user data may include an entire backup image of the disks of the computing device 102, software installed on the device 102, user application data such as personal documents, or the like.

The backup module 104 may also retrieve data that is not stored locally at the computing device 102. In exemplary aspects, the backup module 104 stores and/or retrieves user data as a set of backup slices 106 to/from a cloud archive 130, or alternatively, a local archive on a physical disk associated with the computing device 102. The backup slices 106 are collectively stored in backup archives 108 in the cloud archive 130. Each backup slice is an image of the user data or physical disk of the computing device 102 at a particular moment in time. Over time, the cloud archive 130 contains many backup archives 108 for different computing devices, each with multiple backup slices.

The backup module 104 communicates with the cloud archive 130 over a network 101 (e.g., the Internet). In some instances, if the backup module 104 would like to restore data from the backup archives 108, a scan would be performed. When the backup archives 108 have grown considerably in size (e.g., beyond a predetermined threshold such as 500 GB), requesting a scan to be performed may take a significant amount of time and resources. In the case where the archives 108 are stored locally, the backup module 104 may take up a significant amount of resources of the computing device 102 that may be needed elsewhere. Such resources may include storage space, memory (e.g., RAM), and processing power.

In order to avoid excessive consumption of resources, whether locally and/or at a cloud platform, the cloud archive 130 is subjected to periodic scanning by the archive scanner 110, according to some exemplary aspects. The archive scanner 110 comprises an archive mounter service 112, an archive API 114 and an archive mount driver 116. In some aspects, the archive scanner 110 is executing as a service over the network 101, though in other aspects, the archive scanner 110 may be executing on the computing device 102. Furthermore, other configurations are contemplated where the archive scanner may operate on a different server or on the same server as the cloud archive 130.

The archive scanner 110 performs antivirus and malware scans on the backup archives 108 to ensure that when data is retrieved from the cloud archive, a computing device such as computing device 102 does not accidentally become infected. The device (e.g., a server) that is executing the archive scanner 110 may have a physical disk 120. In exemplary aspects, the device may comprise a host machine and a virtual machine. In exemplary aspects, the archive scanner 110 receives a request to scan the backup archives 108. The archive API 114 is used to retrieve new and modified blocks from the slices stored in the backup archives 108. The archive mount driver 116 receives a request to mount an archive slice from the backup archives 108, allowing the archive scanner 110 to work with the archive as a disk. The archive mount driver 116 may mount the archive slice as virtual disk 122. The archive mount driver 116 allows the ability to save changes to the data in the mounted slice if changes were made, according to some aspects.

In exemplary aspects, the archive scanner 110 detects all modified blocks in the most recent slices since creation of the most recent slice. Subsequently, the archive scanner 110 uses the archive API 114 to determining a correspondence of files in the one or more slice with data blocks on the mounted disk. Such a determination may be made using a block map. Once the correspondence has been created, the files on the mounted virtual disk 122 that align with the modified blocks are also assumed to either be new or modified. Thus, these new files on the virtual disk 122 can be scanned for infection, viruses and malicious software. The archive API 114 can be further invoked by the archive scanner 110 to remove infected and/or damaged files and malware from the virtual disk 122. Finally, the archive scanner 110 can save the virtual disk 122 as a new cured slice in the backup archives 108 stored in the cloud archive 130 (or stored on a storage device local to computing device 102). In some other aspects, the existing slice may be removed and replaced with the new cured slice.

Aspects for forming the block map depend on the particular OS and file system. For example, in Windows NTFS files can be master file table (MFT) resident (stored inside MFT records) or non-resident, stored in the volume storage space. In one aspect, the allocated blocks of the non-resident file may be retrieved using a system function call, e.g., "FSCTL_GET_RETRIEVAL_POINTERS API". MFT resident files block maps may be determined with the analysis of the MFT allocation and the known file identifier, which is generally the MFT record number. The MFT record number allows inspection and knowledge of the blocks of the MFT resident file. The analysis of the MFT allocation can also be determined with the help of system function "FSCTL_GET_RETRIEVAL_POINTERS" for example, but for the entire MFT, which is also a file. Other file systems can require their own special algorithms that build the files block map(s).

The archive scanner 110 may also be configured to scan one or more older slices in the backup archive 108 in order to discover an infected slice. Once such an infected or otherwise compromised slice is identified, the archive scanner 110 marks the infected slice and slices taken subsequently (temporally) as infected and unsuitable for data recovery for any computing device. Accordingly, the backup module 104 is configured to block any attempts to restore slices that are marked as infected. Furthermore, this allows the archive scanner 110 to establish a time of compromise that can be used for further analysis regarding the type of infection and the factors that may have been involved in the compromise. In some aspects, historical attributes of the computing device 102 can be stored in the cloud archive 130, or elsewhere, and analyzed along with the time of compromise to establish a set of causes of the compromise/infection. This analysis can be used to prevent future infections or malware attacks.

Figure 2:
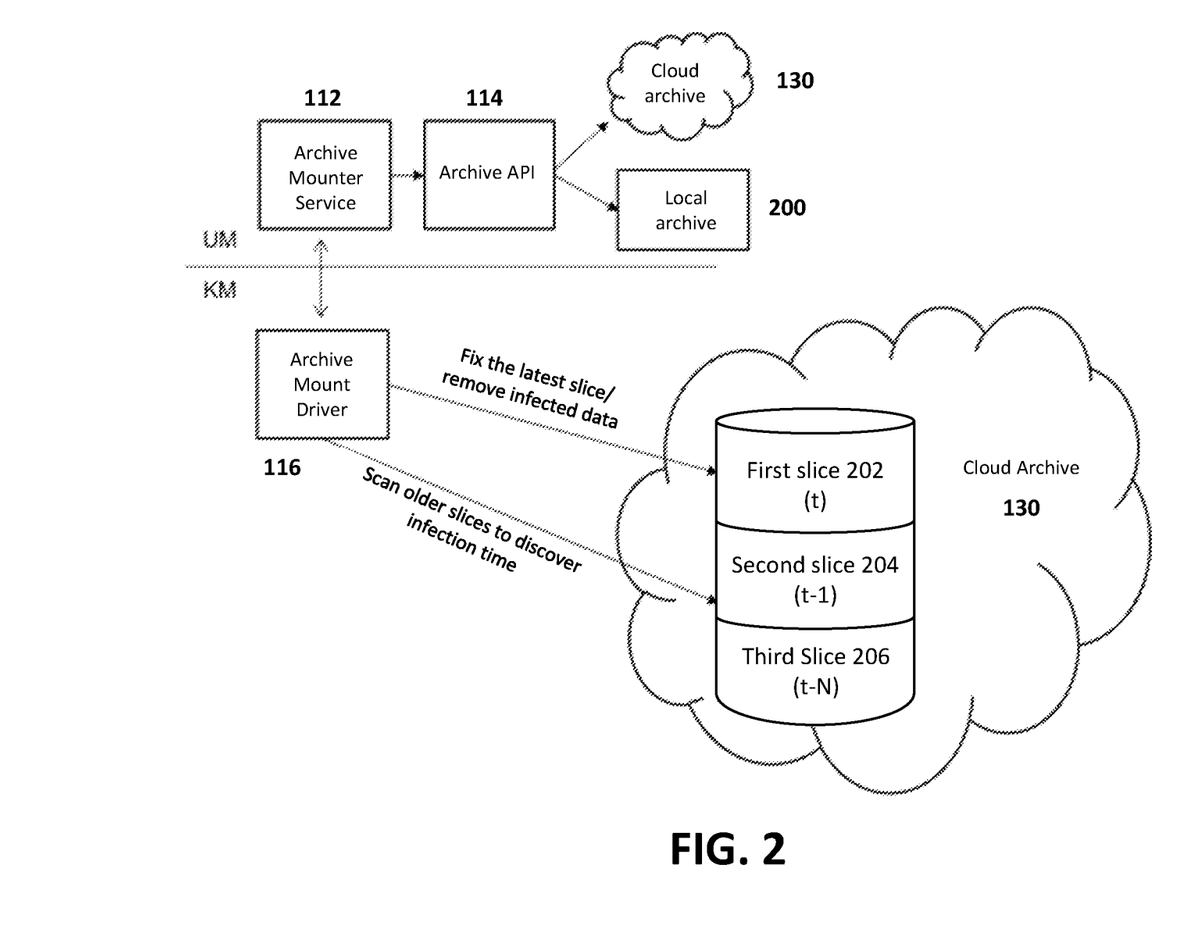
FIG. 2 is a block diagram of a sequence of scanning backup archives by inspecting archive slices.

FIG. 2 is a block diagram illustrating the sequence of the system and method of scanning backup archives by inspecting archive slices, according to exemplary aspects of the disclosure.

In exemplary aspects, the archive mounter service 112, the archive API 114 and the cloud archive 130 and the local archive 200 may be located in the user memory space (UM), while the archive mount driver 116 may be located in kernel memory space (KM). In order to access the cloud archive 130 or a local archive 200, the archive scanner 110 contacts the archive mounter service 112. The archive mounter service 112 uses the mount driver 116 to mount the archives to a disk (e.g., a virtual disk).

Referring to FIG. 2, mount driver 116 mounts, to disk 120, a first slice 202 of a plurality of slices (e.g., slices 202-206) in cloud archive 130, wherein the first slice is an image of user data (e.g., on computing device 102) at a first time. Archive API 114 then detects a modified block of the mounted first slice by comparing blocks of the mounted first slice to blocks of a second slice 204 of the plurality of slices, wherein the second slice is an image of the user data captured before the first time. For example, first slice 202 may have been created at time t. Second slice 204 may have been created at time t−1.

Archive API 114 may then compare the blocks of the respective mounted disks of the respective slices to find blocks that have been altered. When a modified block is found, archive mounter service 112 identifies, on a file system of the disk, at least one file in the mounted first slice that corresponds to the detected modified block. Archive scanner 110 then scans the at least one file for viruses and malicious software. In response to detecting that the at least one file is infected, archive scanner 110 generates a cured slice that comprises the user data of the mounted first slice without the at least one file. This generation process may comprise removing the at least one file from the mounted first slice 202. In some cases, where multiple modified blocks are found in slice 202 relative to slice 204, the generation process involves generating a copy of the second slice 204, transferring, to the copy of the second slice, all files corresponding to the plurality of modified blocks and not including any infected file (here, the copy of the second slice is the cured slice).

In some aspects, archive scanner 110 may arbitrarily scan a third slice 206 of the plurality of slices in the backup archive for viruses and malicious software. The third slice 206 may be an image of the user data captured before a creation time of the second slice (i.e., t-N). In response to detecting an infected file in the third slice 206, archive scanner 110 may mark a subset of the plurality of slices captured subsequent to a creation time of the third slice as unsuitable for data recovery. In this particular example, both first slice 202 and the second slice 204 would be included in the subset.

In some aspects, archive scanner 110 may identify a block of the third slice 206 that corresponds to the infected file. Archive scanner 110 may mount the second slice 204 and the first slice 202 to the disk 120. Archive scanner 110 may track the block and determine whether the infected file exists on any one of the second slice and the first slice. For example, the infected file may exist on second slice 204, but the user may have manually removed the infected file from first slice 202. Because the infected file does not exist on first slice 202, only the third slice 206 and the second slice 204 need to be cured. This will ensure that the backup archive has a clean set of slices that a user can back up from.

In some aspects, if the archive contains infected slices, the archive scanner 110 may discover these slices to determine when infection occurred (based on slice creation time) and the source of the infection or malware by scanning the slices.

Figure 3:
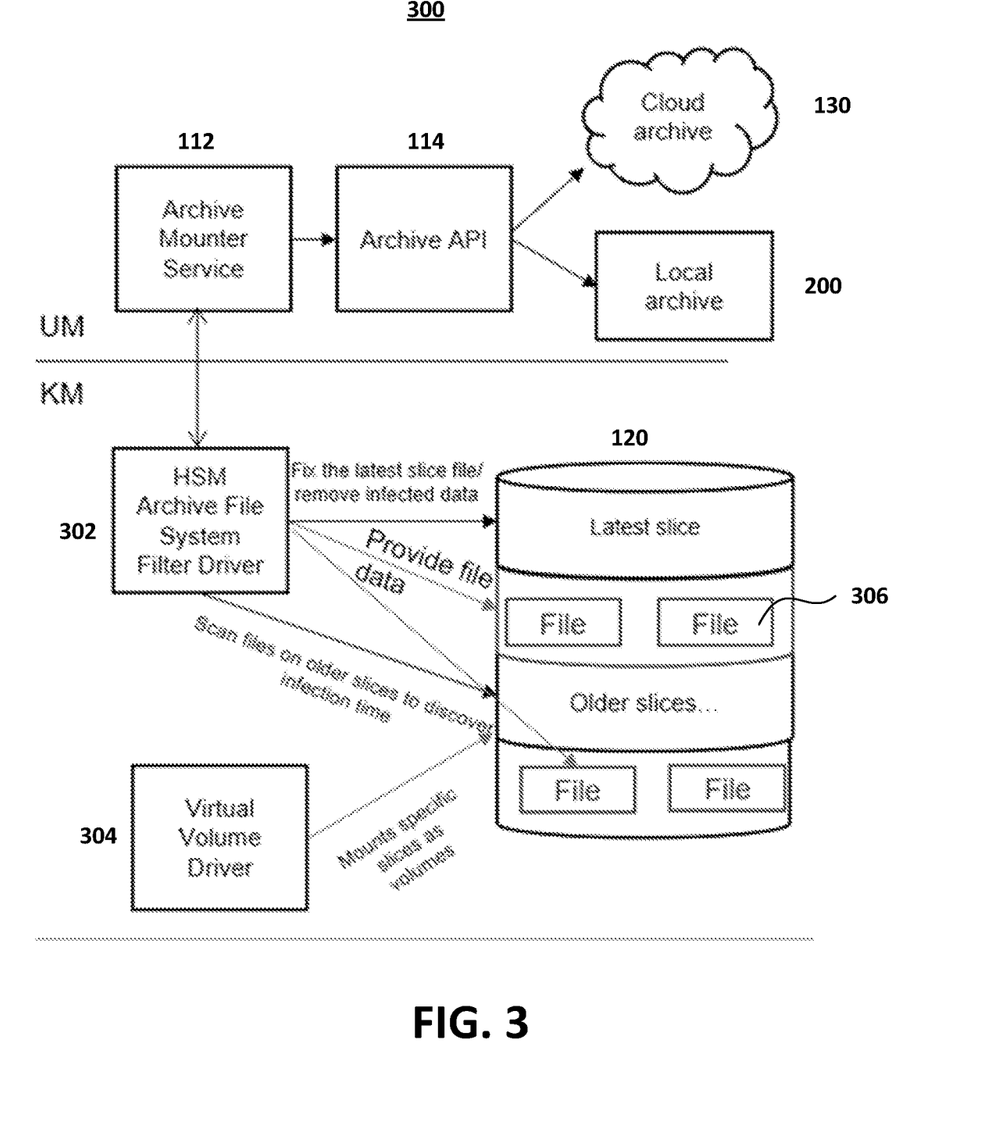
FIG. 3 is a block diagram of inspecting archive slices for malware using empty sparse files.

FIG. 3 is block diagram 300 of inspecting archive slices for malware using empty sparse files. Diagram 300 introduces HSM archive file system filter driver 302 and virtual volume driver 304. Antivirus scanning of backups stored in the cloud is usually a very time-consuming procedure that requires a lot of hardware resources. This is due to the fact that cloud storage usually contains large amounts of data, the speed of access to the cloud is significantly slower than to local storage, and at the same time, backups must be scanned quite often.

The present disclosure previously described technology that is applicable to image archives when the data is backed up on a sector-by-sector basis. However, there are file-only archives as well as archives of a different nature (e.g., databases, e-mail archives, etc.), and working with such objects at the block sector level may be ineffective. Currently, arbitrary time points in the archive can be scanned and can fix the latest slice or mark older as not suitable for recovery. However, this functionality is limited to image archives and does not apply to file archives.

Accordingly, virtual volume driver 304 and the HSM archive file system filter driver 302 are utilized to provide access to any slice of file archives and any files on them to further scan the slices and remove malicious/infected files. From a high-level overview, slices can be mounted, using virtual volume driver 304, in the archives (cloud or local) as empty (e.g., no files). More specifically, the mounted slice is populated with empty zero data files (but with proper virtual sizes). When an AV scan is performed, and it can be performed on specific files, HSM filter driver 302 fetches the data on access and fills the scanned file. In the latest slice, infected data and malware can be removed and the latest slice can be recreated with the fixed data for potential restore/recovery.

It should be noted that access to slices of the cloud file archive is accomplished using the appropriate API (e.g., API 114). The mounted virtual volume comprises empty sparse files on the given volume, but reproduces the structure of the backup slice it is based on and contains information about the files in it. Archive API 114 may track requests to read a file from antivirus software and retrieve the contents of this file from the backup archive in case of a read request. From here, archive scanner 110 may scan received files in virtual volume, delete infected files, and recreate the last slice of the archive.

As discussed previously, cloud archive 130 and local archive 200 contain data backups (used interchangeably with "backup archives") with files. A user may regularly perform backups of their computing devices and all the changed files are sent to the archives. In terms of performing backups, it should be understood that the first backup is of all files and all subsequent backups are incremental (only new and modified files are copied). Each backup session results in a separate backup slice, which reflects the state of the data at a certain point in time.

Virtual volume driver 304 creates empty volumes for each backup slice. These volumes are later scanned for malware. Such volumes are virtual and do not contain any data aside from a list of files in a respective backup slice and relevant file information (e.g., name, number, size, location, metadata, etc.). The real data is in fact stored in the real backup slice in the backup archive. This allows for scanning a file backup archive in the cloud.

Virtual volume driver 304 mounts the virtual volume, which fully displays the structure of the physical slice despite not containing the actual data. Subsequently, a hierarchical filter driver, HSM archive file system filter driver 302, creates empty sparse files that match the actual files in the backup slice. Here, access to specific files can be implemented without need to access the entire file system as a whole.

Driver 302 provides access to the contents of a file, compares changes between files in two different slices, and if there are such changes, downloads the contents of the file from the archive in the cloud. Driver 302 then places the contents, in the virtual volume, in the placeholder corresponding to this file (e.g., the empty sparse file).

Thus, only a set of files that changed between the creation of two sequential slices are considered. In the latest slice, infected data and malware can be removed and a new slice can be created (i.e., a cured slice) with the fixed data for potential restore/recovery. These systems and methods help to work with specific objects such as databases or email archives, which can be represented in the virtual volume as file entities.

As discussed previously, archive API 114 can be used to get access to a backup archive (either cloud and/or local). Archive API 114 can be specific to any type of archive and storage, and is used to understand the content and structure of a certain archive (because these can be different depending on different vendors of backup and storage software and hardware).

Figure 4:
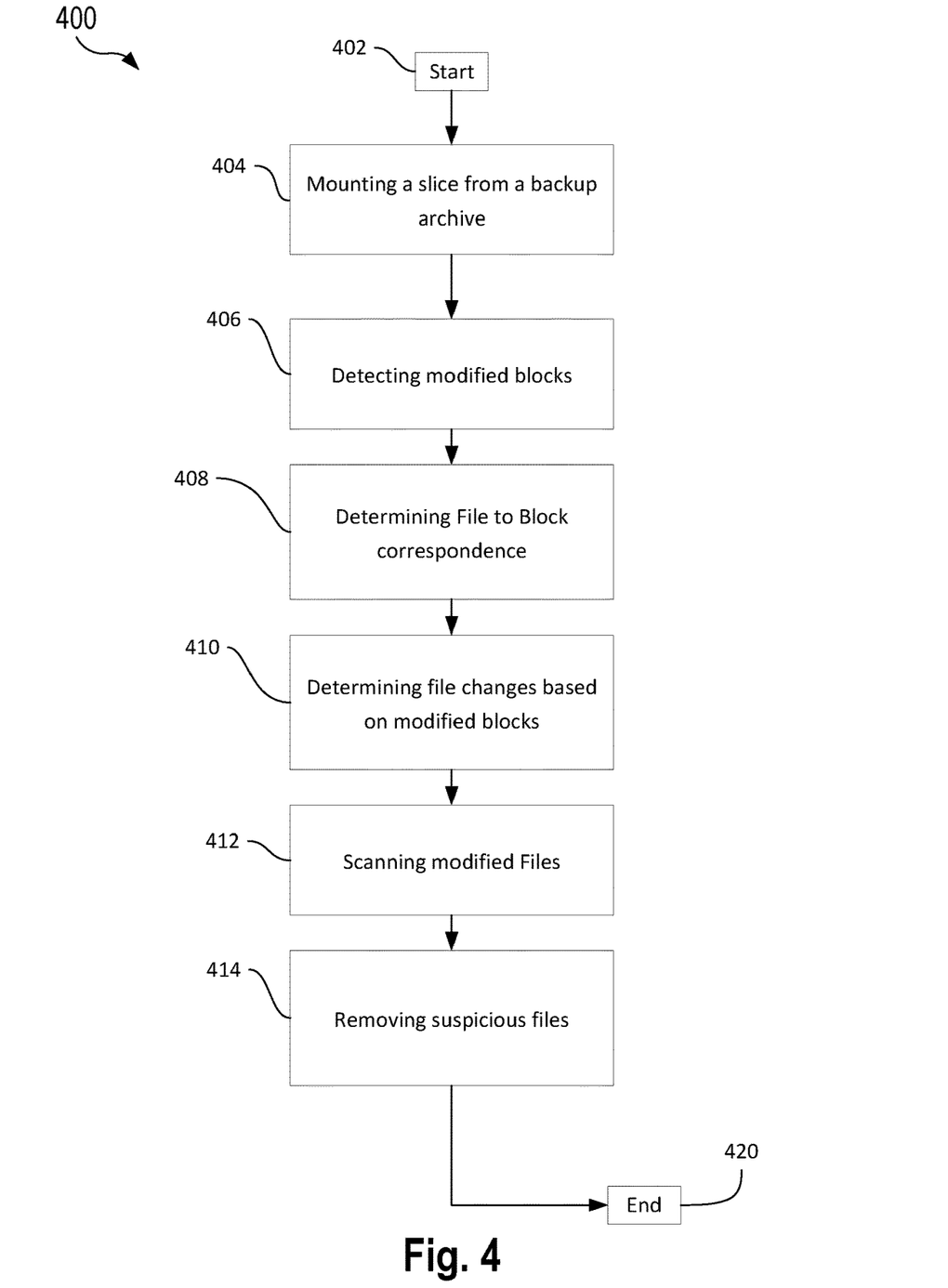
FIG. 4 is a flow diagram of a method of scanning backup archives by inspecting archive slices.

FIG. 4 is a flowchart illustrating a method 400 of scanning backup archives by inspecting archive slices, in accordance with exemplary aspects of the present disclosure.

The method begins at 402 and proceeds to 404.

At 404, components of the archive scanner 110 scan the backup archives by inspecting archive slices. Components of the archive scanner mount a most recent slice from a backup archive to a disk, e.g., by mounting a virtual disk. In some aspects a virtual disk may be mounted on a server executing the archive scanner 110, though the present disclosure is not limited to that configuration.

At 406, the archive API 114 is requested to detect all modified blocks in the most recent slices since creation of the most recent slice. In exemplary aspects, the API 114 inspects the underlying blocks of the virtual disk that the slice is mounted to, in order to determine the modified blocks. In other aspects, the modified blocks are detected by comparing blocks of the most recent slice to blocks of previously created slices for previous backups of a computing device. The blocks that differ from one slice to the next comprises the modified set of blocks.

At 408, the archive scanner 110 determines a correspondence of files in the one or more slice with data blocks on the mounted disk. In some aspects, the archive scanner 110 establishes or reads the block map of the particular backup slice being mounted, where the block map indicates which blocks correspond to which files.

At 410, the archive scanner 110 determines on the file system of the disk, the files that have been modified by identifying the modified data blocks. Since the modified data blocks have been identified, the block can be used to identify which files corresponding to the modified data blocks.

At 412, the archive scanner 110 scans the files on the file system that have been modified since a previous backup slice was completed for viruses and malicious software.

At 414, the archive scanner 110 may remove infected and/or damaged files and malware from the virtual disk. The virtual disk can then be saved as the most recent slice and reinserted into the backup archives 108 in the cloud archive 130, or at a local disk.

The method terminates at 420.

Figure 5:
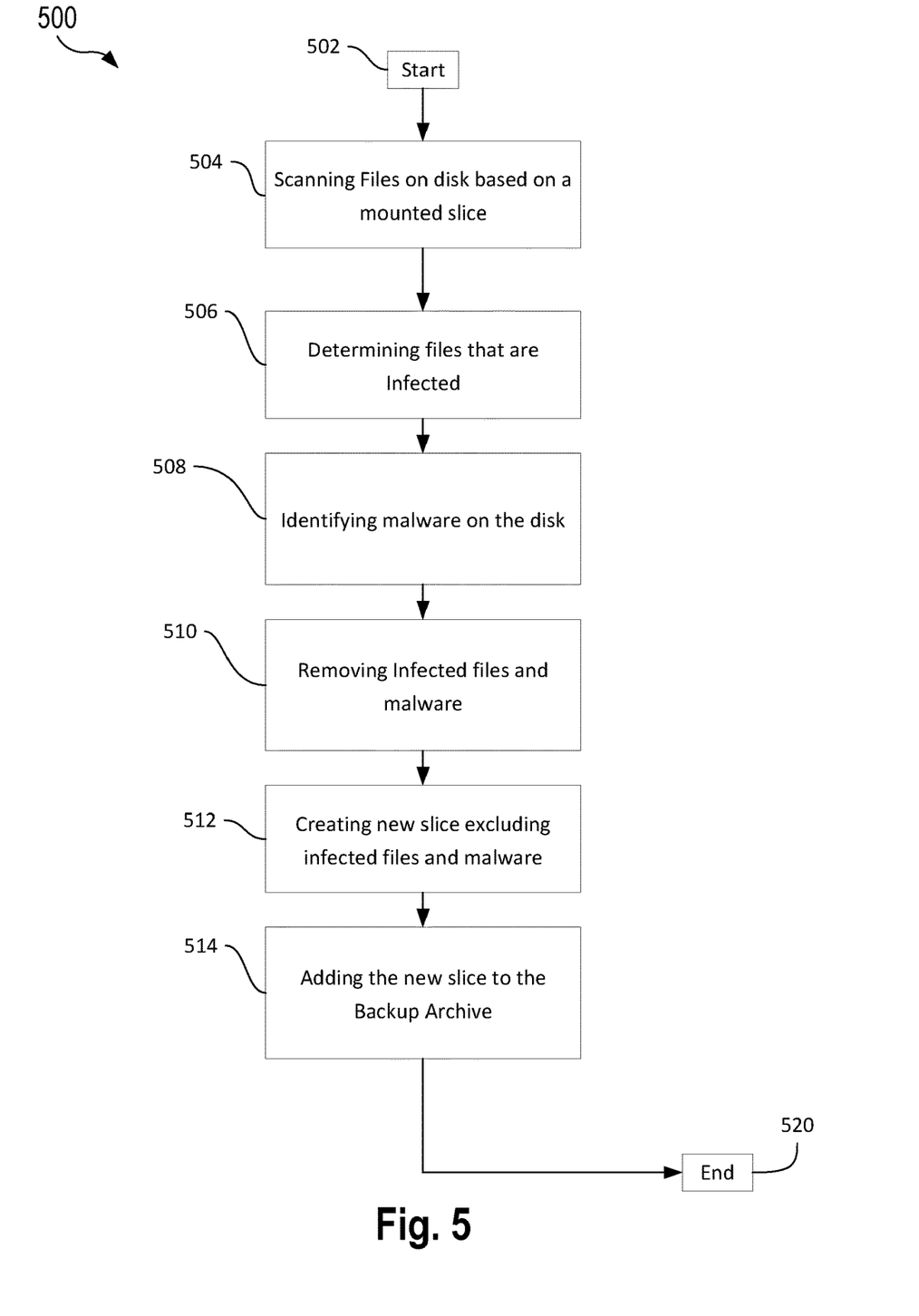
FIG. 5 is a flowchart illustrating a method of scanning backup archives by inspecting archive slices.

FIG. 5 is a flowchart illustrating another method 500 of scanning backup archives by inspecting archive slices, in accordance with exemplary aspects of the present disclosure.

The method begins at 502 and proceeds to 504.

At 504, the archive scanner 110 scans the backup image mounted on the virtual disk in method 400. In exemplary aspects, the backup image or the archive image as it may be referred to, may be mounted as a virtual disk or, in other aspects, restoring the slice to a physical disk.

At 506, the files that are infected are identified and marked. In some aspects the files are identified based on the modified blocks identified in method 400 using a block map or other method. The block map shows a correspondence between blocks and files on the mounted image. Thus when the modified blocks are identified, the archive scanner 410 can identify the modified files.

At 508, any malware present on the mounted backup image is identified by performing a virus and malware scan on the files on the virtual disk.

At 510, the infected files and malware are removed from the file system of the disk (e.g., a virtual disk) by the archive scanner 110. In some aspects, the infected files and/or malware is quarantined, either on the virtual disk or elsewhere. It should be noted that moving infected files to a quarantine on the virtual disk requires creating the cured slice that comprises the quarantine.

At 512, a new slice is created by the archive scanner 110, excluding the infected files and malware by exporting the virtual disk as a new slice. The new slice is either stored on a new virtual disk or in another location such as the virtual disk 122, or in a cloud archive 130 as shown in FIG. 2 (e.g., latest slice 202).

At 514, the archive scanner adds the newly created and cured slice on top of the most recent slice in the backup archive (e.g., archive 108). In some alternative aspects, the newly created slice may replace the most recent slice or the infected slice.

The method terminates at 520.

Figure 6:
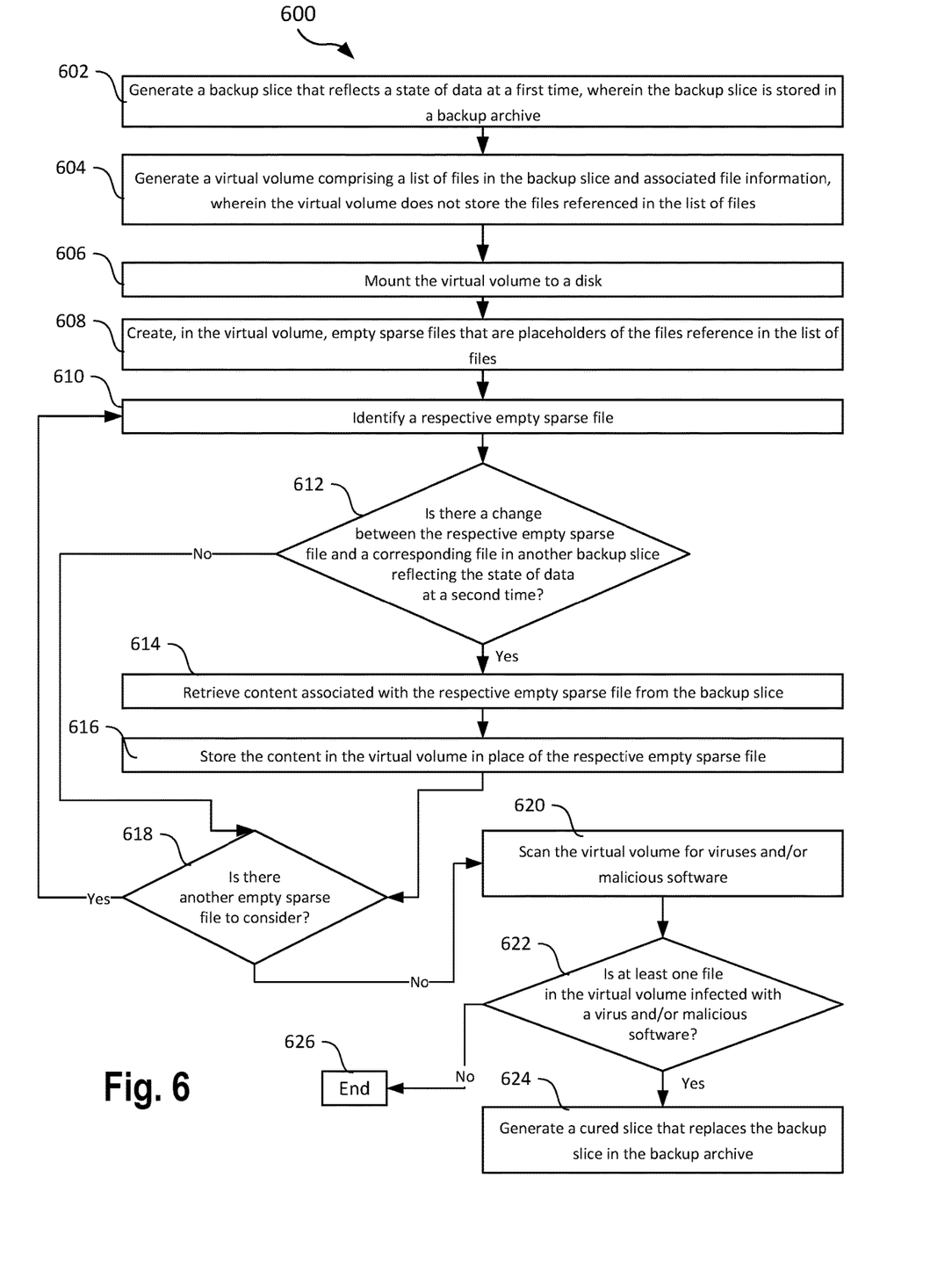
FIG. 6 is a flowchart illustrating a method of inspecting archive slices for malware using empty sparse files.

FIG. 6 is a flowchart illustrating method 600 of inspecting archive slices for malware using empty sparse files. At 602, a backup slice is generated that reflects a state of data at a first time, wherein the backup slice is stored in a backup archive (e.g., archive 130 and/or archive 200). At 604, virtual volume driver 304 generates a virtual volume comprising a list of files in the backup slice and associated file information, wherein the virtual volume does not store the files referenced in the list of files. At 606, archive mounter service 112 mounts the virtual volume to disk 120. At 608, HSM archive file system filter driver 302 creates, in the virtual volume, empty sparse files 306 that are placeholders of the files reference in the list of files.

Suppose that there are N files in the list of files. At 610, archive API 114 identifies a respective empty sparse file. At 612, archive API 114 detects where there is a change between the respective empty sparse file and a corresponding file in another backup slice reflecting the state of data at a second time. For example, archive API 114 may compare file information associated with the respective empty sparse file with file information associated with the corresponding file in the another backup slice (e.g., compare names, sizes, metadata, etc.).

In response to detecting a change between the respective empty sparse file and the corresponding file, method 600 advances to 614, where driver 302 retrieves content associated with the respective empty sparse file from the backup slice. At 616, driver 302 stores the content in the virtual volume in place of the respective empty sparse file.

Method 600 then advances to 618, where archive API 114 determines if there are other empty sparse files to consider from the list (i.e., all files in the list are checked for changes). If more sparse files remain, method 600 returns to 610 where the next sparse file is identified. Otherwise, method 600 advances to 620, where archive scanner 110 scans the virtual volume for viruses and/or malicious software.

At 622, archive scanner 110 determines whether there is at least one file in the virtual volume infected with a virus and/or malicious software. If there are no infected files, method 600 ends at 626. However, in response to detecting that at least one file in the virtual volume is infected with a virus and/or malicious software, at 624, archive scanner 110 generates a cured slice that replaces the backup slice in the backup archive.

Figure 7:
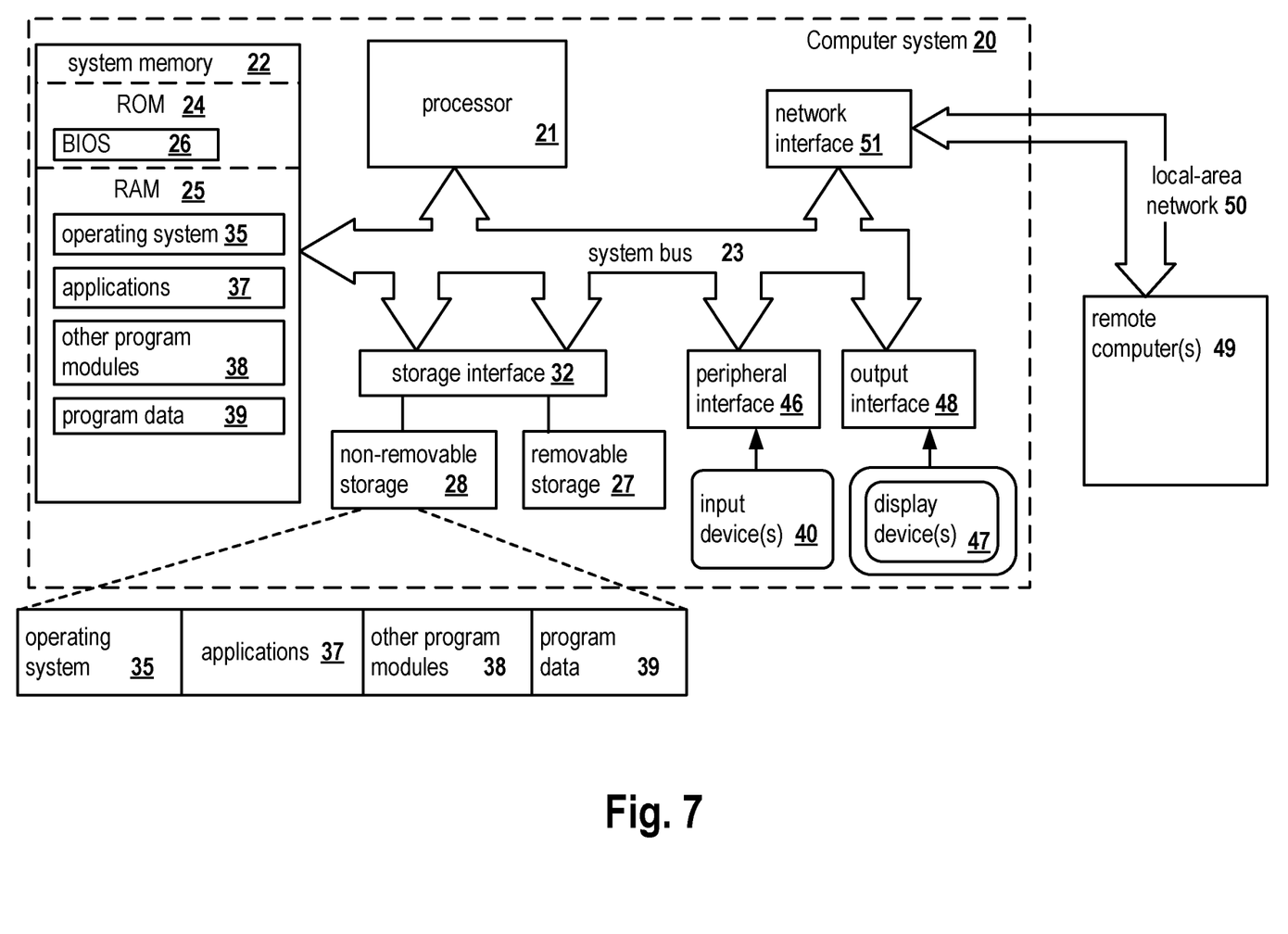
FIG. 7 is a block diagram of a computer system on which the disclosed system and method can be implemented according to an exemplary aspect.

FIG. 7 is a block diagram illustrating a computer system 20 on which aspects of systems and methods of scanning backup archives by inspecting archive slices may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for inspecting archive slices for malware, the method comprising:
    generating a backup slice that reflects a state of data at a first time, wherein the backup slice is stored in a backup archive;
    generating a virtual volume comprising a list of files in the backup slice and associated file information, wherein the virtual volume does not store the files referenced in the list of files;
    mounting the virtual volume to a disk;
    creating, in the virtual volume, empty sparse files that are placeholders of the files referenced in the list of files;
    for each respective empty sparse file:
        comparing file information associated with the respective empty sparse file with file information associated with a corresponding file in another backup slice reflecting the state of data at a second time; and
        in response to detecting a change between the respective empty sparse file and the corresponding file:
            retrieving content associated with the respective empty sparse file from the backup slice; and
            storing the content in the virtual volume in place of the respective empty sparse file;
    scanning the virtual volume for viruses and/or malicious software; and in response to detecting that at least one file in the virtual volume is infected with a virus and/or malicious software, generating a cured slice that replaces the backup slice in the backup archive.

2. The method of claim 1, wherein the first time is after the second time.

3. The method of claim 1, wherein the virtual volume is generated by a virtual volume driver.

4. The method of claim 1, wherein the associated file information comprises at least one of:
(1) a file number of a respective file in the list,
(2) a location of the respective file in the backup slice,
(3) a file size of the respective file.

5. The method of claim 1, wherein generating the cured slice comprises removing the at least one file from the mounted virtual volume.

6. The method of claim 1, wherein generating the cured slice comprises:
generating a copy of the backup slice; and
transferring, to the copy of the backup slice, all unchanged files in the list of files and not including the at least one file, wherein the copy of the backup slice is the cured slice.

7. The method of claim 1, wherein the virtual volume is mounted to the disk subsequent to or concurrently with another virtual volume associated with the another backup slice.

8. The method of claim 1, further comprising adding the cured slice to the backup archive.

9. A system for inspecting archive slices for malware, the system comprising: a hardware processor configured to:
generate a backup slice that reflects a state of data at a first time, wherein the backup slice is stored in a backup archive;
generate a virtual volume comprising a list of files in the backup slice and associated file information, wherein the virtual volume does not store the files referenced in the list of files;
mount the virtual volume to a disk;
create, in the virtual volume, empty sparse files that are placeholders of the files referenced in the list of files;
for each respective empty sparse file:
compare file information associated with the respective empty sparse file with file information associated with a corresponding file in another backup slice reflecting the state of data at a second time; and
in response to detecting a change between the respective empty sparse file and the corresponding file:
retrieve content associated with the respective empty sparse file from the backup slice; and
store the content in the virtual volume in place of the respective empty sparse file;
scan the virtual volume for viruses and/or malicious software; and
in response to detecting that at least one file in the virtual volume is infected with a virus and/or malicious software, generate a cured slice that replaces the backup slice in the backup archive.

10. The system of claim 9, wherein the first time is after the second time.

11. The system of claim 9, wherein the virtual volume is generated by a virtual volume driver.

12. The system of claim 9, wherein the associated file information comprises at least one of:
(1) a file number of a respective file in the list,
(2) a location of the respective file in the backup slice,
(3) a file size of the respective file.

13. The system of claim 9, wherein the hardware processor is configured to generate the cured slice by removing the at least one file from the mounted virtual volume.

14. The system of claim 9, wherein the hardware processor is configured to generate the cured slice by:
generating a copy of the backup slice; and
transferring, to the copy of the backup slice, all unchanged files in the list of files and not including the at least one file, wherein the copy of the backup slice is the cured slice.

15. The system of claim 9, wherein the virtual volume is mounted to the disk subsequent to or concurrently with another virtual volume associated with the another backup slice.

16. The system of claim 9, wherein the hardware processor is further configured to add the cured slice to the backup archive.

17. A non-transitory computer readable medium storing thereon computer executable instructions for inspecting archive slices for malware, including instructions for:
generating a backup slice that reflects a state of data at a first time, wherein the backup slice is stored in a backup archive;
generating a virtual volume comprising a list of files in the backup slice and associated file information, wherein the virtual volume does not store the files referenced in the list of files;
mounting the virtual volume to a disk;
creating, in the virtual volume, empty sparse files that are placeholders of the files referenced in the list of files;
for each respective empty sparse file:
comparing file information associated with the respective empty sparse file with file information associated with a corresponding file in another backup slice reflecting the state of data at a second time; and
in response to detecting a change between the respective empty sparse file and the corresponding file:
retrieving content associated with the respective empty sparse file from the backup slice; and
storing the content in the virtual volume in place of the respective empty sparse file;
scanning the virtual volume for viruses and/or malicious software; and
in response to detecting that at least one file in the virtual volume is infected with a virus and/or malicious software, generating a cured slice that replaces the backup slice in the backup archive.

18. The non-transitory computer readable medium of claim 17, wherein the first time is after the second time.

19. The non-transitory computer readable medium of claim 17, wherein the virtual volume is generated by a virtual volume driver.

20. The non-transitory computer readable medium of claim 17, wherein the associated file information comprises at least one of:
(1) a file number of a respective file in the list,
(2) a location of the respective file in the backup slice,
(3) a file size of the respective file.

* * * * *